United States Patent
Mori et al.

(10) Patent No.: US 6,623,547 B2
(45) Date of Patent: Sep. 23, 2003

(54) METHOD FOR REMOVING SULFURIC ACID MIST AND APPARATUS FOR REMOVING THE SAME

(75) Inventors: Yasuhiko Mori, Niihama (JP); Tetsuya Suzuta, Niihama (JP)

(73) Assignee: Sumitomo Chmical Company, Limited, Osaka (JP)

(*) Notice: Subject to any disclaimer, the term of this patent is extended or adjusted under 35 U.S.C. 154(b) by 54 days.

(21) Appl. No.: 09/920,817

(22) Filed: Aug. 3, 2001

(65) Prior Publication Data

US 2002/0020294 A1 Feb. 21, 2002

(30) Foreign Application Priority Data

Aug. 21, 2000 (JP) ........................................ 2000-250384

(51) Int. Cl.[7] .............................................. B01D 53/14
(52) U.S. Cl. ............................. 95/211; 95/213; 95/235; 96/296; 96/297; 96/299
(58) Field of Search ..................... 95/211, 213, 235, 95/226; 96/290, 296, 297, 299

(56) References Cited

U.S. PATENT DOCUMENTS

| | | | |
|---|---|---|---|
| 3,780,499 A | * | 12/1973 | Dorr et al. |
| 3,847,570 A | * | 11/1974 | Gunther |
| 3,944,401 A | * | 3/1976 | Dorr et al. |
| 3,944,650 A | | 3/1976 | Hirota et al. |
| 3,959,419 A | * | 5/1976 | Kitterman |
| 3,996,317 A | * | 12/1976 | Sarmiento et al. |
| 4,348,373 A | * | 9/1982 | Schoubye |
| 5,185,017 A | | 2/1993 | Tanigawa et al. |
| 5,246,471 A | | 9/1993 | Bhat et al. |
| 5,660,615 A | * | 8/1997 | Neumann et al. |
| 6,036,756 A | | 3/2000 | Gohara et al. |
| 2002/0020294 A1 | * | 2/2002 | Mori et al. |

FOREIGN PATENT DOCUMENTS

| | | |
|---|---|---|
| EP | 0 178 630 A | 4/1986 |
| JP | 52 149265 A | 12/1977 |
| JP | 05-200283 | 8/1993 |
| JP | 06-171907 | 6/1994 |

\* cited by examiner

Primary Examiner—Duane S. Smith
(74) Attorney, Agent, or Firm—Sughrue Mion, PLLC

(57) ABSTRACT

The present invention provides a method for removing sulfuric acid mist wherein a gas containing sulfuric acid mist is bubbled into an absorbing solution through a gas diffuser having pores with an average pore diameter of about 1,000 $\mu$m or less. This method allows simple and highly effective removal of sulfuric acid mist.

11 Claims, 3 Drawing Sheets

METHOD FOR REMOVING SULFURIC ACID MIST AND APPARATUS FOR REMOVING THE SAME

BACKGROUND OF THE INVENTION

1. Technical Field of the Invention

The present invention relates to a method for removing sulfuric acid mist existing in a gas and to an apparatus for removing sulfuric acid mist used in such method.

Sulfuric acid mist generally generates in a process in which a wet gas is dried with concentrated sulfuric acid, or generates in a desulfurization equipment by condensation of $SO_3$ in the exhaust gas with water, or sometimes generates in various other chemical processes.

As a so-called method for removing $SO_x$, a washing system with a scrubber using an alkali solution or water as an adsorbing solution is well known. According to this system, removal of about 90% or more of $SO_2$ is possible but only about 50% of $SO_3$ can be removed.

Sulfuric acid mist causes deterioration of quality of products when contaminated in the products, inhibition of reaction when contaminated in a gas used in a chemical process, and corrosion of apparatus. In addition, a gas containing sulfuric acid mist is a cause of environmental pollution when it is exhausted. Therefore, it is desirable to remove the mist to the utmost.

2. Description of the Related Art

As methods for removing sulfuric acid mist, known methods include a method in which the mist is passed through a filter such as glass wool (JP-A-6-171907), a method in which an absorbent, such as titania or the like, having affinity to the mist (JP-A-5-200283), a method using an electrostatic precipitator and so on.

However, the trapped amount of the mist is limited in the method using a filter such as glass wool. When sulfuric acid mist containing minute particles of 1 $\mu$m or less is subjected to the method, about 1 to about 2 ppm by volume of the mist passes unremoved even if a high effective filter for removing mist is used.

In the method using an absorbent described above, regeneration and repacking of the absorbent become necessary and thus the process management is complicated. On the other hand, the method using an electrostatic precipitator has a problem that the cost is expensive.

SUMMARY OF THE INVENTION

The purpose of the invention is to provide a method for removing sulfuric acid mist, which allows simple and highly effective removal of sulfuric acid mist, and an apparatus for removing sulfuric acid mist in such method.

The inventors of the present invention have studied a method for removing sulfuric acid mist in order to solve the above described problems, as a result, discovered that a method for removing sulfuric acid mist which comprises bubbling a gas containing sulfuric acid mist into an absorbing solution through a gas diffuser having pores with an average pore diameter of about 1,000 $\mu$m or less, allows simple and highly effective removal of sulfuric acid mist.

That is, the present invention provides to a method for removing sulfuric acid mist which comprises bubbling a gas containing sulfuric acid mist into an absorbing solution through a gas diffuser having pores with an average pore diameter of about 1,000 $\mu$m or less.

In other words, the invention enables effective washing and removal of sulfuric acid mist by passing a gas containing sulfuric acid mist in an absorbing solution in the form of minute bubbles through a gas diffuser having an average pore diameter of 1,000 $\mu$m or less so that the gas-liquid contact is increased.

It is preferred, for enhancing efficiency of removing sulfuric acid mist, to use a porous material having an average pore diameter of about 500 $\mu$m or less and a porosity of about 30% or more as the gas diffuser in the present invention. In addition, a bubble-cap type gas diffuser provided with a cap having pores with an average pore diameter of about 1,000 $\mu$m or less can be used suitably.

An apparatus for removing sulfuric acid mist of the present invention comprises plural washing tanks containing an absorbing solution and equipped with a gas diffuser having an average pore diameter of about 1,000 $\mu$m or less for bubbling a gas containing sulfuric acid mist into the absorbing solution, wherein respective washing tanks are connected such that the gas containing sulfuric acid mist passes through these washing tanks in order.

An preferable apparatus for removing sulfuric acid mist of the present invention comprises a washing tower, in which the inside is divided into plural stages by trays containing the gas diffuser at least in a part, a washing solution is poured on the trays for each stages so as to form washing tanks, an inlet of the gas containing sulfuric acid mist is provided at a lower part of the tower, and an outlet of the gas is provided at an upper part of the tower.

By this constitution, the gas containing sulfuric acid mist introduced from the lower part of the tower ascends in the tower while being washed at every stage in the form of minute bubbles, and therefore sulfuric acid mist can be removed with high efficiency.

DETAILED DESCRIPTION OF THE INVENTION

The present invention will hereinafter be described in detail.

A gas diffuser used in the present invention includes, for example, porous materials having communicated pores for passing a gas. Examples of such porous materials include sintered compacts comprising synthetic resins such as polypropylene, polyvinyl chloride, polystyrene, ABS resin and the like, sintered compacts (ceramics) comprising aluminum oxide or the like as the main component, and the like.

The porous materials having an average pore diameter of about 1,000 $\mu$m or less are usable, and one having an average pore diameter of about 500 $\mu$m or less and a porosity of about 30% or more is preferable. When the average pore diameter exceeds about 1,000 $\mu$m, bubbles produced have a too large size so that the gas-liquid contact becomes insufficient, and therefore there is a possibility that a rate of removal of sulfuric acid mist by absorption becomes lowered. When the porosity is less than about 30%, the number of bubble formed per unit area is small, and therefore there is a possibility that an efficiency of removal becomes lowered.

The porous materials usable in the present invention include, in addition to the above-described examples, membrane materials, filter materials and the like with minute pores having an average pore diameter of about 1,000 μm or less for passing a gas.

In the method of the present invention, a gas containing sulfuric acid mist is bubbled into an absorbing solution through the above described gas diffuser.

A flow rate of the gas containing sulfuric acid mist is about 100 to about 5000 m$^3$/hour, preferably about 500 to about 2000 m$^3$/hour, more preferably about 1000 to about 1500 m$^3$/hour per m$^2$ of a diffusion area of the gas diffuser. If the flow rate is more than about 5000 m$^3$/hour per m$^2$ of a diffusion area of the gas diffuser, the gas-liquid contact is increased, but pressure drop increase.

A depth of the absorbing solution is about 0.1 to about 2 m, preferably about 0.1 to about 1 m, more preferably about 0.2 to about 0.5 m. If the depth of the absorbing solution is more than 2 m, a height of the washing tank or the washing tower is too high although the removal efficiency is increased.

The present invention will now be described in detail with reference to the attached drawings.

Figure 1:
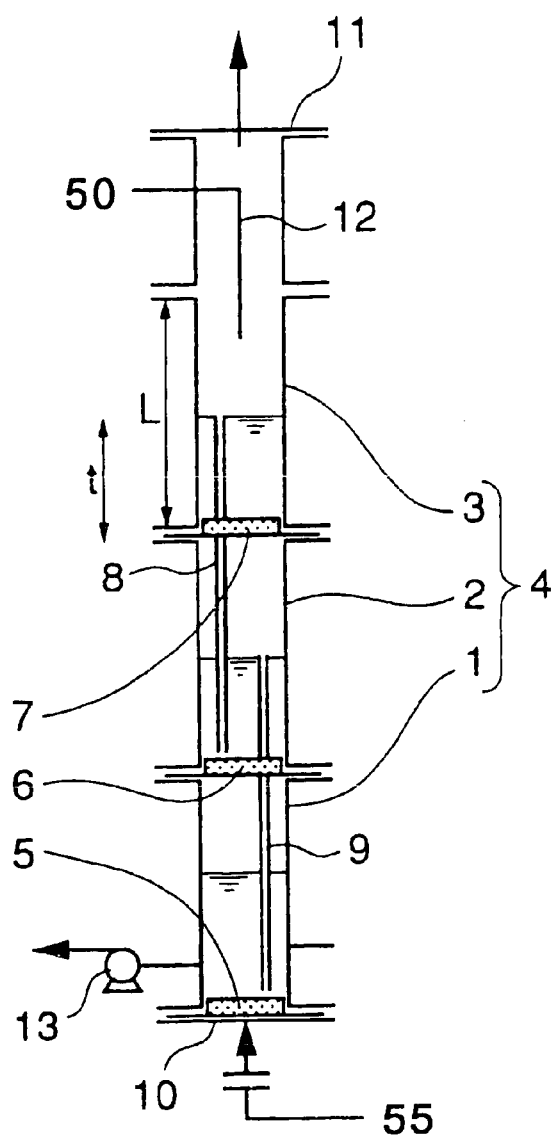
FIG. 1 is a schematic sectional view showing an apparatus for removing sulfuric acid mist according to an embodiment of the present invention.

FIG. 1 shows a schematic sectional view of an apparatus for removing sulfuric acid mist according to an embodiment of the present invention. As shown in FIG. 1, the apparatus has a washing tower composed of three stages of cylinders. Trays at lower parts of respective steps are composed of gas diffusers 5, 6 and 7 made of a porous material, which form washing tanks 1, 2 and 3 for washing a gas containing sulfuric acid mist. Overflow pipes 8 and 9 penetrate the gas diffusers 7 and 6 at the first and second stages from the upper end. In addition, an inlet 10 of the gas containing sulfuric acid mist is provided below the gas diffuser 5 at the lowermost stage, and an outlet 11 of the gas is provided at an upper part of the tower. A part of the trays separating respective washing tanks 1, 2 and 3 may be composed of the gas diffusers 5, 6 and 7.

The respective washing tanks 1, 2 and 3 are fixed integrally by their opposite flange parts sandwiching support parts of the gas diffuser 5, 6 and 7.

A feed nozzle 12 for absorbing solution is provided above the washing tank 3 at the uppermost stage. The absorbing solution 50 (for example, water, alkaline solution or the like) fed from the nozzle 12 to the washing tank 3 at the uppermost stage overflows through the overflow pipe 8 when its amount arrives at a certain level, is fed to the washing tank 2 at the following stage, and is further fed to the washing tank 1 at the lowermost stage through the overflow pipe 9. The absorbing solution in the washing tank 1 is suitably withdrawn using a pump 13 so that a constant liquid amount is maintained.

For removing sulfuric acid mist, a gas containing sulfuric acid mist 55 is fed with a given pressure from the inlet 10 to the washing tank 1 at the lowermost stage through the gas diffuser 5. At this time, the gas is fed into the absorbing solution in the washing tank 1 in the form of minute bubbles formed by the gas diffuser 5. The gas ascending in the absorbing solution in the washing tank 1 with gas-liquid contact is fed from an upper space in the washing tank 1 to the washing tank 2 through the following gas diffuser 6 taking again the form of minute bubbles, similarly with gas-liquid contact. By repeating this process, the gas passes through the washing tank 3 at the uppermost stage and exhausted from the outlet 11 of the gas. The pressure drop of the gas per a gas diffuser is about 0 to 200 mmAq in the pressure drop subtracting the liquid head.

In the gas washed in this manner, more than about 99% of sulfuric acid mist is removed, and the concentration of sulfuric acid mist can be lowered to about 0.01 ppm by volume or below.

Figure 2:
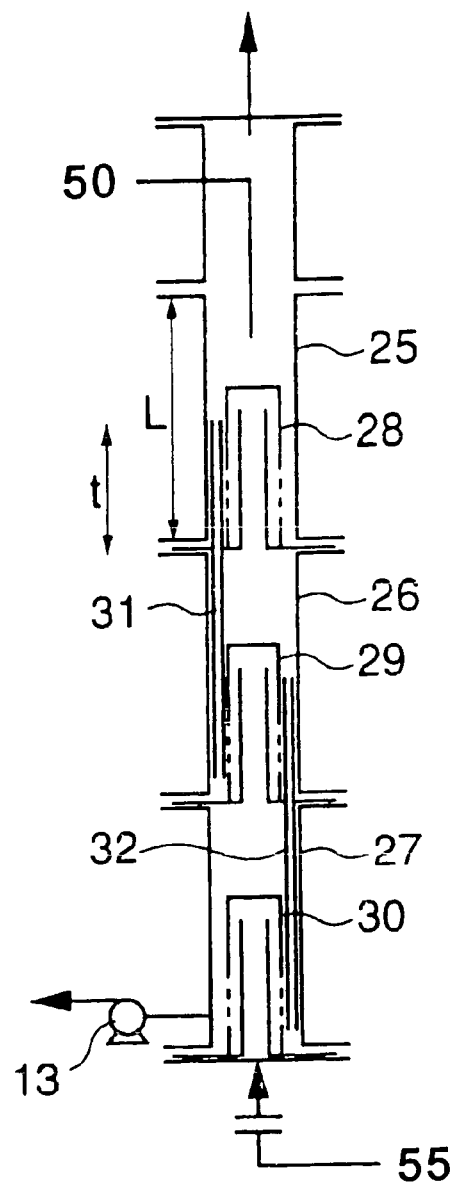
FIG. 2 is a schematic sectional view showing a bubble-cap tower as an apparatus for removing sulfuric acid mist according to another embodiment of the present invention.

Next, another embodiment of the present invention is described with reference to FIG. 2. As shown in FIG. 2, an apparatus for removing sulfuric acid mist of this embodiment composed of plural stages of bubble-cap towers, respective stages having bubble-cap type cap trays equipped with caps 28, 29 and 30, which form washing tanks 25, 26 and 27. In the caps 28, 29 and 30, pores having an average pore diameter of 1,000 μm or less are perforated. The number of pores perforated in the caps 28, 29 and 30 is decided according to the size or other factors of the apparatus and therefore is not particularly limited. Overflow pipes 31 and 32 are provided in this bubble-cap towers similarly to the above description and they lead the absorbing solution 50 from an upper part of the tower to lower parts, thereby maintaining the amount of the solution in respective washing tanks 25, 26 and 27 at a constant level and securing sufficient gas-liquid contact. Other constitutions are similar to those in the former embodiment.

For removing sulfuric acid mist in this embodiment, a gas containing sulfuric acid mist 55 is fed from the inlet at the lower part to the washing tank 27 at the lower most stage, similarly to the above-description. At this time, the gas containing sulfuric acid mist is blown out through the inside of the cap 30 and bubbled into the absorbing solution in the form of minute bubbles. The gas ascending in the absorbing solution in the washing tank 27 with gas-liquid contact is bubbled out from the pores in the next cap 29 located above the washing tank 27 again in the form of minute bubbles, and similarly subjected to gas-liquid contact. By repeating this process, the gas passes through the washing tank 25 at the uppermost stage and exhausted from the outlet. The pressure drop of the gas per a gas diffuser is about 0 to 200 mmAq in pressure drop subtracting the liquid head.

While, in all the above-described embodiments, three stages of washing tanks 1, 2 and 3 or 25, 26 and 27 are provided, the number of stages can be decided suitably according to a desired rate of removal or concentration of sulfuric acid mist. In addition, in place of providing washing towers or bubble-cap towers, respective washing tanks can be connected by means of gas pipes so that the gas passes through all the washing tanks in order. The pressure drop and gas flow rate in respective tanks can be decided suitably and therefore is not particularly limited.

Specific applications of the method for removing sulfuric acid mist and the apparatus for removing sulfuric acid mist of the present invention include (i) removal of sulfuric acid mist contained in exhaust gas, (ii) removal of sulfuric acid mist generated in chemical processes, (iii) removal of sulfuric acid mist generated in a step in which a wet gas is dried with concentrated sulfuric acid, and others.

The step in which a wet gas is dried with concentrated sulfuric acid is applied, for example, also in the production of chlorine by oxidation reaction of hydrogen chloride. The method is performed by carrying out the oxidation reaction of hydrogen chloride in the presence of a catalyst using hydrogen chloride and oxygen containing gas as raw materials, and dehydrating the generated gas with sulfuric acid, and isolating and recovering chlorine in the generated gas by compression and cooling.

A residual gas from chlorine-recovery, obtained after isolation of chlorine, containing oxygen gas as a main component is re-used as apart of a raw material. At this time, when sulfuric acid mist is contained in a large amount in the residual gas from chlorine-recovery, sulfur compounds acting as the catalyst poison deposit on the catalyst surface so that the activity of the catalyst is lowered and a steady reaction for a long period become difficult. Therefore, when the method and apparatus for removing sulfuric acid mist of the present invention are applied to this process for producing chlorine, sulfuric acid mist can be removed from the residual gas from chlorine-recovery to a level of 0.01 ppm by volume or less, and thus the lowering of the catalyst activity is prevented and a steady reaction for a long period is enabled.

EXAMPLES

The invention will now be described in detail with reference to Examples and Comparative Examples but the following Examples should not be construed as a limitation upon the scope of the invention.

Example 1

Removal of sulfuric acid mist was conducted using the apparatus shown in FIG. 1. The three stages of washing tanks 1, 2 and 3 constituting the washing tower 4 were composed respectively of cylinders having a length (L) of 0.5 m and an inside diameter of 0.1 m. At lower parts of respective stages were attached the gas diffusers 5, 6 and 7 composed of porous materials (average pore diameter: 100 $\mu$m; porosity: 35%) made of polyvinyl chloride. In this case, a diffusion area per each diffuser was $7.5 \times 10^{-3}$ $m^2$.

Water was fed as an absorbing solution 50 from the top of the tower at a flow rate of 10 kg/hour. This water flowed downward through the overflow pipes 8 and 9 fixed at respective stages to the following stages and finally discharged to the outside of the system. The projected length (t) of the overflow pipes 8 and 9 on the gas diffusers were 0.3 m.

A gas containing sulfuric acid mist 55 at a concentration of 4 ppm by volume as a value converted to $SO_4^{2-}$ was introduced from the lowermost part of the washing tower 4. This gas was prepared by bubbling the air of 10 $m^3$/hour into about 15 liters of 98% sulfuric acid and introducing into a mist separator packed with fillers (Raschig rings). A flow rate of the gas was about 1300 $m^3$/hour per $m^2$ of the diffusion area of the gas diffuser.

As the result of treatment by introducing the gas containing sulfuric acid mist into the washing tower 4, the concentration of the mist in the gas at the top of the tower was 0.005 ppm by volume and the rate of removal was 99.9%. The pressure drop by use of the gas diffuser was about 450 mmAq and, when the liquid head was subtracted, it was 150 mmAq.

Example 2

Figure 3:
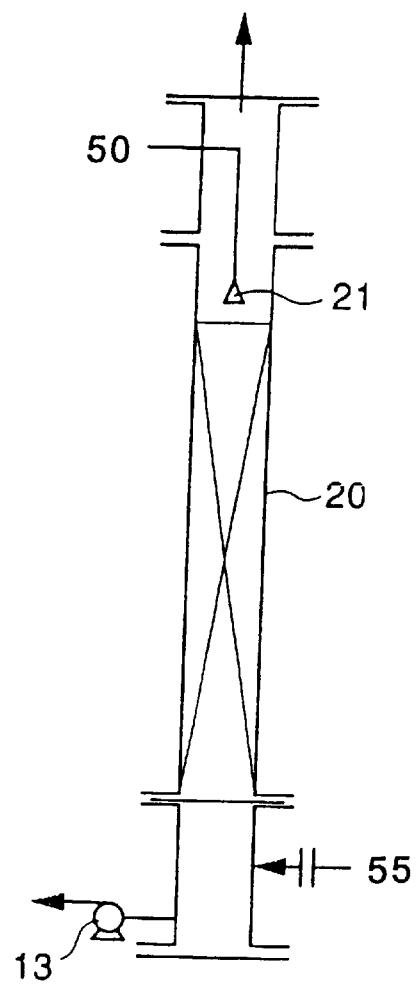
FIG. 3 is a schematic sectional view showing a packed column used in Comparative Example 1.

A process for removing sulfuric acid mist was conducted using a bubble-cap tower. Briefly, a bubble-cap tower (washing tower) was used comprising of three stages of washing tanks 25, 26 and 27 having an inside diameter of 0.1 m respectively provided with caps 28, 29 and 30 with 160 pores having a diameter of 1 mm per stage, as shown in FIG. 3. In these caps, a diffusion area per each cap was $3.7 \times 10^{-3}$ $m^2$. The depth (t) of an absorbing solution at respective stages was adjusted to 300 mm by the overflow pipes 31 and 32. The interval (L) between stages was 500 mm and the amount of water as an absorbing solution 50 fed from the top of the tower was 10 kg/hour.

When a gas containing sulfuric acid mist 55 prepared in a manner similar to that in Example 1 was introduced at a rate of 10 $m^3$/hour from the bottom part of the tower. A flow rate of the gas was about 2600 $m^3$/hour per $m^2$ of the diffusion area of the gas diffuser (cap). The concentration of sulfuric acid mist at the top of the tower was 0.04 ppm by volume and the rate of removal was 99%. The pressure drop at respective stages was about 450 mmAq.

Comparative Example 1

A process for removing sulfuric acid mist was conducted using a packed tower. Raschig rings (size: ½ inch) were packed in a packing tower having a length of 1.5 m and an inside diameter of 100 mm, as shown in FIG. 2, and a gas containing sulfuric acid mist 55 prepared in a manner similar to that in Example 1 was introduced at a rate of 10 $m^3$/hour from the bottom part of the tower. In addition, a spray nozzle 21 was provided at the top of the tower in order to improve diffusion of water, and water as an absorbing solution 50 was sprayed from the spray nozzle 21 to the inside of the tower and discharged from the bottom of the tower. The amount of fed water varied within a range of 10 to 200 kg/hour. As the result, the concentration of sulfuric acid mist in the gas at the top of the tower was 1.2 to 2.0 ppm by volume and the rate of removal was 50 to 70%.

The method for removing sulfuric acid mist and the apparatus for removing sulfuric acid mist of the present invention have an advantage that they allow simple and highly effective removal of sulfuric acid mist.

What is claimed is:

1. A method for removing sulfuric acid mist which comprises bubbling a gas containing sulfuric acid mist into an absorbing solution through a gas diffuser having pores with an average pore diameter of about 1,000 $\mu$m or less.

2. The method according to claim 1, wherein a flow rate of said gas containing sulfuric acid is about 100 to about 5000 $m^3$/hour per $m^2$ of a diffusion area of the gas diffuser.

3. The method according to claim 1, wherein a depth of said absorbing solution is about 0.1 to about 2 m.

4. The method according to claim 1, wherein said gas diffuser is a porous material having an average pore diameter of about 500 $\mu$m or less and a porosity of about 30% or more.

5. The method according to claim 1, wherein said gas diffuser is a bubble-cap gas diffuser provided with a cap having pores with an average pore diameter of about 1,000 $\mu$m or less.

6. The method according to claim 1, wherein said bubbling of a gas containing sulfuric acid mist into an absorbing solution is carried out plural times by turns.

7. An apparatus for removing sulfuric acid mist comprising plural washing tanks containing an absorbing solution and equipped with a gas diffuser having an average pore diameter of about 1,000 $\mu$m or less for bubbling a gas containing sulfuric acid mist into said absorbing solution, wherein respective washing tanks are connected such that the gas containing sulfuric acid mist passes through these washing tanks by turns.

8. The apparatus for removing sulfuric acid mist according to claim 7, wherein said apparatus comprises a washing tower, in which the inside space is divided into plural stages by trays containing said gas diffuser at least in a part, the washing solution is pored on said trays for each stages so as to form washing tanks, an inlet of gas containing sulfuric acid mist is provided at a lower part of the tower, and an outlet of a gas is provided at an upper part of the tower.

9. An apparatus for removing sulfuric acid mist according to claim 8, wherein said gas diffuser is a porous material having an average pore diameter of about 500 µm or less and a porosity of about 30% or more, and the all or a part of trays comprises said porous material.

10. An apparatus for removing sulfuric acid mist according to claim 8, wherein said trays are bubble-cap trays provided with a cap having pores with an average pore diameter of about 1,000 µm or less.

11. An apparatus for removing sulfuric acid mist according to claim 8, wherein the inlet of the absorbing solution is provided above the gas diffuser on the uppermost stage, the absorbing solution is fed from the inlet of the absorbing solution on the gas diffuser on the uppermost stage, and the absorbing solution overflow is transferred by an overflow means to the following stage in order.

* * * * *